United States Patent [19]
Miller et al.

[11] Patent Number: 6,108,383
[45] Date of Patent: Aug. 22, 2000

[54] METHOD AND APPARATUS FOR COMPRESSION AND DECOMPRESSION OF VIDEO IMAGES

[75] Inventors: Daniel Miller; Timothy S. Murphy, both of New York; Blake Sloan, Woodstock; David Silver, New York; Eric Ameres, Cohoes, all of N.Y.

[73] Assignee: On2.com, Inc., New York, N.Y.

[21] Appl. No.: 09/115,895

[22] Filed: Jul. 15, 1998

Related U.S. Application Data

[60] Provisional application No. 60/052,594, Jul. 15, 1997.

[51] Int. Cl.$^7$ .......................................... H04N 7/26
[52] U.S. Cl. ........................... 375/240; 348/415; 348/420
[58] Field of Search ............................. 375/240; 348/384, 348/390, 400, 401, 402, 409, 415, 416, 420, 421, 411, 412, 413

[56] References Cited

U.S. PATENT DOCUMENTS

| | | | |
|---|---|---|---|
| 5,068,724 | 11/1991 | Krause | 348/402 |
| 5,091,782 | 2/1992 | Krause | 348/400 |
| 5,274,442 | 12/1993 | Murakami | 348/420 |

*Primary Examiner*—Bryan Tung
*Attorney, Agent, or Firm*—Lerner, Berger & Langsam

[57] ABSTRACT

This invention uses a novel synthesis of several different compression methods, some original and some known in the art, to achieve compression of digitized video image sequences. Images are color-reduced by a factor of two in both directions using a colorspace that requires minimal computation for reconstruction of RGB pixel values. Images are then transformed into a 'token sequence' corresponding to a series of 4×4 blocks, using one of seven transformation methods, some dependent on previous frames and some dependent only on pixel values in neighboring blocks. The resulting token sequence is then compressed using known lossless methods, including Huffman coding.

13 Claims, 3 Drawing Sheets

VIDEO COMPRESSION ALGORITHM

CHROMA FOR DETAILED QUADRANT IS REDDIFF=−64, BLUEDIFF=−32

ONE−HALF RESOLUTION GRID (HEAVY LINES) REPRESENTS CHROMA (RED − GREEN DIFFERENCE AND BLUE − GREEN DIFFERENCE) PLANE

FULL RESOLUTION GRID (LIGHT LINES) REPRESENTS GREEN PLANE

METHOD AND APPARATUS FOR COMPRESSION AND DECOMPRESSION OF VIDEO IMAGES

This application claims benefit of Provisional Application Ser. No. 60/052,594 filed Jul. 15, 1997.

REFERENCE TO COMPUTER PROGRAM LISTING APPENDIX

A computer program listing of the source code for the preferred embodiment of the invention is attached as an appendix hereto.

INTRODUCTION

Lossy and Lossless Data Compression

Image compression in general employs two distinct forms of compression to achieve reduced file size: Lossy and Lossless compression. Lossy compression can be described as any optimization which reduces the file size and degrades the quality of the output (most image compression schemes offer a way to retain or sacrifice quality). Shrinking an image to ¼ of its original size is a simple but LOUSY lossy algorithm. Lossless compression is an optimization which reduces size and preserves the quality of the output. Replacing the word "the" with the letter "Q" is a way to losslessly compress english text by 30%. (removing the word "the" altogether gives a better ratio but it's lossy ie it degrades the quality of the output "Rain in Spain Grows Mainly on Plain).

DETAILED DESCRIPTION OF THE INVENTION

Figure 1:
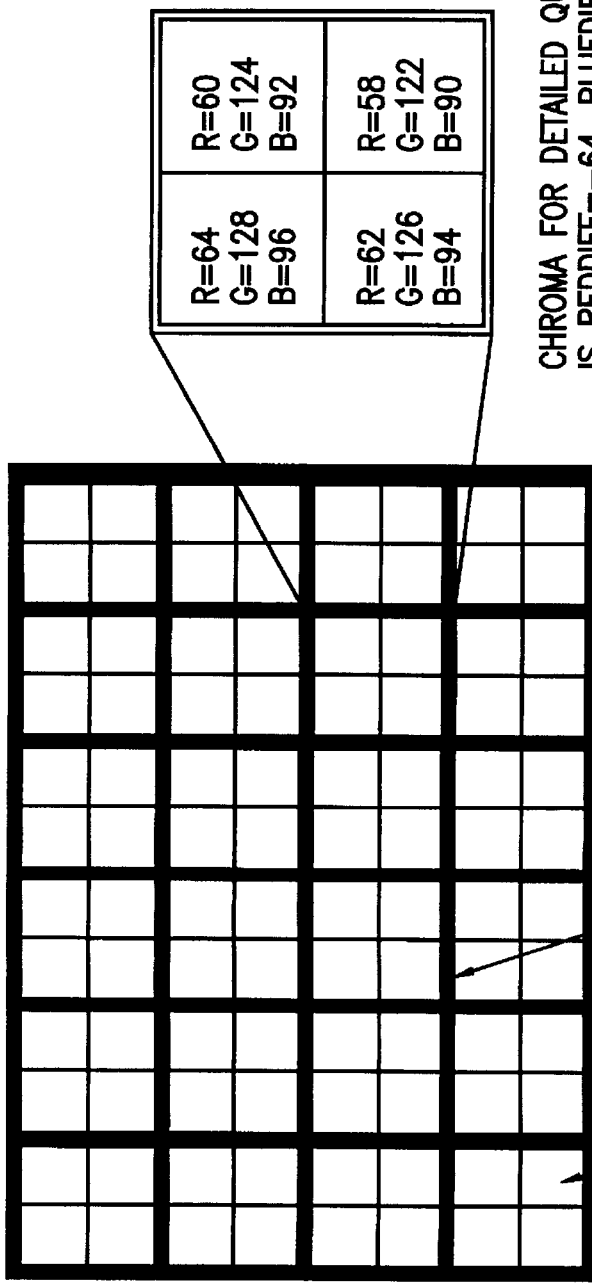

This invention compresses the source image as a sequence of 4×4 pixel blocks, read from the source image and compressed in left-to-right top-to-bottom order. A compressed block can be one of two super-types and one of seven subtypes. The supertypes are Intraframe and Interframe. The subtypes are broken down as follows:

```
Intraframe:
    High Res (high resolution)
            - 16 changes in green's_BiDirectional
              Rate of Change_
            - 4 changes in red and blue differences'_BDRC_
    Medium Res (medium resolution)
            - 16 changes in green's_BDRC_
            - 1 change in red and blue differences'_BDRC_
    Low Res (low resolution)
            - 4 changes in green's_BDRC_
            - 1 change in red and blue differences'_BDRC_
    Null    - no change in either components_BDRC_
    Res
Interframe:
    Still   - no change in pixels from previous frame
    Motion  - pixels copied from another region of previous frame
            - 2 spatial coordinates (X offset and Y offset)
    Update  - small change in pixels from previous frame
            - 16 temporal changes in green
            - 4 temporal changes in red and blue differences
```

A frame will be referred to (and marked as) "IntraFrame" if it is known to only contain Intraframe blocks. Periodically frames are forced to be Intraframe to ensure that frame-to-frame dependencies do not continue indefinitely, allowing 'random access' to frames within the video sequence.

Data-Rate control is achieved by limiting/expanding the use of various blocktypes according to the recorded previous and predicted future data-rates. In the Preferred Embodiment, this is achieved by assigning an empirical threshold to each Blocktype except High-Res and adjusting these thresholds dynamically during compression.

Each blocktype is associated with a 'token-weight'—the exact number of tokens stored for a block of that type. Since, for every block, a token must be stored to indicate the block's type, every blocktype has a token-weight of one or greater. Still-Blocks and Null-Resolution-Blocks have a token-weight of one—the only token stored is the one which indicates the block's type.

In the Preferred Embodiment, the choice of which blocktype to use for a particular 4×4 block of pixels is made by a layer of 'intelligence' which provisionally compresses a single block (ie converts it to tokens and overwrites the original pixel values as playback values) as few of the seven ways as necessary to achieve the most desirable output in terms of quality and/or compression in the smallest possible amount of time.

The block-choice logic goes as follows: First, a block is compressed as High-Res. Then, the block is compressed as each of the three or six token-lightest blocktypes (depending on whether the frame is Intraframe or Interframe) from lightest to heaviest. The new 'compressed' pixel values are compared to the High-Res compressed pixel values using summed-squared-differences. If the positive integer result of this comparison is less than the threshold for the blocktype, the 'compressed' tokens are retained and the next block in the sequence is compressed.

We will begin our discussion with a definition of terms used in our description:

Object:

An entity with various members and, to be useful, related operations. To define a new class of object and the members it contains we use the syntax:

```
class a {
        type or class b
        type or class c . . .
        other members
}
```

Instance:

An extant object of a particular type. The syntax we will use for creating an instance of an object is objectType x Value:

For our purposes, a real number or quantity. It can be positive, negative, fractional or zero.

Integer:

A whole (non-fractional) number.

Array:

A list or matrix of values or objects, like a list of test scores or a spreadsheet. We will access elements of one-dimensional arrays with integers (eg. an array containing −200, 5.12, 9999, 0.00001, −26) 2 represents the 3rd element of the array (9999) and 0 represents the first (−200)). Multidimensional arrays are accessed using (x, y, z, . . . ) coordinates. Thus element (3,4 ) of array 'a' is in the fourth column, fifth row (since (0, 0) is the first position). Defining an array or creating an instance of one requires the constituent object type AND the arrays dimensions. Our syntax for this procedure is array objectType x[arrayLength]

or array objectType x[arrayDimension1][arrayDimension2]

for multidimentional arrays.

Ordinal:

An unsigned integer used to represent a value which occupies said integers position in an array.

Token:

A symbol (usually a number) used to represent a numerically unrelated value.

Vectors:

A vector is an object containing a number of values. These values represent different properties of the same object. A date is a vector—6/24/97 contains three values which represent month day and year—three 'properties' of a date.

Some Vectors useful to this algorithm:

Many of the objects we use in the algorithm are vectors. The RGB triplet of values can be treated as an object of class 'vector'—for instance, added to or subtracted from other RGB triplets by keeping the three components in their own 'slots' and perfoming operations seperately on each component. Similarly, these vectors can be multiplied and divided by single real numbers by perfoming the same operation on each component. Chroma vectors have two signed components (red diff. and blue diff.) For simplicity, arithmatical operations on vectors of any sort will be expressed as, eg. a+b=c, with the understanding that this means all like components of 'a' and 'b' are added to produce a new vector 'c'. An pixel contains the information necessary to construct a chroma vector whose values are 1. the red of the RGB vector minus the green of the RGB vector and 2. the blue of the RGB vector minus the green of the RGB vector.

Regular Arithmatic vs. Vector Arithmatic:

Addition, subtraction, multiplication, division and other math functions on vectors. Typically, it means performing the operation separately on each component of like vectors. Although the results are gibberish, adding 6/24/97 to 8/23/44 would produce the date 14/47/141, this brings up another useful concept called outranging which we will discuss later. Arithmetic operations are simple functions. We use the standard math syntax for such operations. For example:

c=a+b a>b (usually used as a condition to control some process)

Assignment:

In describing the true motion algorithm, we will use a convention common in computer programming which is not standard math syntax; The mathematical operator '=' (equals) will apply actively and not commutatively. The expression A=B will mean: whatever the previous value of A, change its value to that of B. The object on the left is always forced to the value of the evaluated expression on the right.

Unusual arithmetic operators

">>" binary arithmetic shift right, the left operand is the number to be shifted, the right operand is the number of binary positions to shift Functions:

In Mathematical terms, y=f(x) means that f(x) is an operation one can perform using an object of x's type. The value assigned to variable y is said to be the result or the return value. Supposing x is a real number, let's define: f(x) as x+1. The name of the function is f(x) pronounced 'f of x'. The other part of this definition is called the function's body. This is a simple operation which adds one to a real number and returns the result. Sometimes a function operates on more than one object: z=f(x,y). Such a function's body might read: f(x,y)=x to the 'y'th power. It is also possible for a function to change the objects that it operates on: Suppose f(x)=increment x by one. There is no return value in this case, however the value of x is altered after performing f(x).

For our purposes we will use the following syntax to define a function's behavior:

a f(b x, c y, . . . ) {body}

The leftmost expression is the type of object the function returns if any. It can be omitted if no object is returned. Next is the function name; always the last thing before the open-parenthesis. Inside the parenthesis are any number of doublets called parameters representing the objects being operated on by the function, preceded by their type. In this case a, b and c are typeNames, x and y are symbols representing instances of objects on which the function operates. Inside the curly brackets are any number of invocations of functions on the parameter objects as well as instantiations of some objects necessary for the execution of the function.

Once a function is defined, it can be invoked as follows:

z=f(x, y)

Since the types going into and coming out of the function have already been defined it is sufficient to use only the objects names. The above function will set the state of z according to whatever state x and y hold.

Objects and functions as properties:

Sometimes a function simply does what it does on whatever object one uses it. Consider this example:

sentence=isStupid(anyObject a) {return "valueOf(a) is stupid."}

Some functions have relevance only within a certain scope or only operate on particular types as in this example:

compressedPixel compressPixel(uncompressedPixel ucp)

A class of objects is said to have properties. Concretely, a color can be said to have red, green and blue components. We will access individual properties of objects using, the following convention:

---

```
    c = a.b
A concrete example,
    integer i = pixel.green
In fact 'chroma' could be considered a function of pixel
    chroma chroma( pixel p) {
        chroma c
        c.redDifference = p.red - p.green
        c.blueDifference = p.blue - p.green
        return c
    }
but it could also be considered a property of pixel
class pixel {
    integer red
    integer green
    integer blue
    . . .
    other properties
    . . .
    chroma chroma( pixel p) {
        chroma c
        c.redDifference = red - green
        c.blueDifference = blue - green
        return c
    }
    . . .
    other properties
    . . .
}
```

--- since a chroma object can be generated from the properties of a pixel and nothing else, we favor the the second technique as it makes the description more compact and less ambiguous. The mistake of saying integer.chroma( ) is far less likely than saying chroma(integer). These properties of an object which are not data but functions will be defined within the definition of the object using the syntax described for functions above and invoked using the aforementioned a.b() syntax where 'a' is the instance name and 'b' is the property.

Some Objects Used by the Algorithm:

We will declare some names for the algorithm's frequently used objects:

Image . . . A rectangular array of RGB vectors accesed by 'x,y' coordinates pixel . . . synonymous with RGB vector—contains the red, green and blue components of a color point on the image array chroma . . . a vector containing only the red—green difference and the blue—green difference of a pixel 4x4Block . . . Actually a 5x5 pixel sub-image within a larger parent image. The horizontal and vertical distances of pixel(1,1) of 4x4Block from parent image's pixel(0,0) is almost always divisible by 4.

cx<Type>4x4Block . . . The seven types of compressed 4x4Block

ThreshTable . . . contains an array integer table[8]. The values in this array are thresholds for comparing with return values from the 4x4Block.compare() function mentioned below DeltaTable . . . contains a integer length and an array integer table[length]. The values in such arrays saved in various combinations are literally the 'meat' of a compressed image.

ordinalStream . . . an array of numbers representing various types of compressed data and define the objects in our programming shorthand.

```
class pixel {
    integer red
    integer green
    integer blue
    integer luma() { return red * 7 + green * 12 +
    blue * 5 }
    chroma chroma() {
        chroma c
        c.redDifference = red - green
        c.blueDifference = blue - green
        return c
    }
    integer combine( integer g, chroma c) {
        if { (g > 0) and ( g < 256)}{
            green = g
            red = g + c.redDifference
            blue g + c.blueDifference
            if { ( red < 0) or ( red > 255) or
            ( blue < 0) or ( blue > 255)}{
                return FAILED
            }
            return SUCCEEDED
        }
        else return FAILED
    }
    integer compare( pixel a){
        return (((red - a.red) * (red - a.red) * 7) +
            ((green - a.green) * (green - a.green) * 12) +
            ((blue - a.blue) * (blue - a.blue) * 5))
    }
}
class DeltaTable {
    integer len
    array integer table[ length]
    ordinal nearest( integer x) {
        search table for closest match with x
        change x's value to closest match with x
        return index to closest match with x
    }
    integer delta( integer i){
        return table[i]
    }
```

-continued

```
}
}
class 4x4Block {
    array pixel p[5][5]
    integer compare( 4x4Block blk){
        integer i = 1
        integer j = 1
        integer k = 0
            while { i < 5 }{
                while { j < 5 }{
                    k = k + p[j][i].compare
                    ( blk.p[j][i])
                }
            }
            return k
    }
    InterpolateEdgeGreen(){
        p[1][0].green = ( p[0][0].green +
        p[2][0].green) >> 1
        p[3][0].green = ( p[2][0].green +
        p[4][0].green) >> 1
        p[0][1].green = ( p[0][0].green +
        p[0][2].green) >> 1
        p[0][3].green = ( p[0][2].green +
        p[0][4].green) >> 1
    }
    interpolateEdgeChroma(){
        2 Chromas are interpolated as above for chroma-plane
positions and (1,0)
        (
    }
    integer interpolateEdges(){
        interpolateEdgeGreen()
        interpolateEdgeChroma()
        if { any combine( new green values,
        new chroma values) == FAILED}
        return FAILED
    }
}
class cxHiRes4x4Block{
    array ordinal red[4]
    array ordinal blue[4]
    array ordinal luma[16]
    ordinal btype = 0
}
class cxMedRes4x4Block{
    ordinal red
    ordinal blue
    array ordinal luma[16]
    ordinal btype = 1
}
class cxLoRes4x4Block{
    ordinal red
    ordinal blue
    array ordinal luma[4]
    ordinal btype = 2
}
class cxNulRes4x4Block{
    ordinal btype = 3
}
class cxUpdate4x4Block{
    array ordinal red[4]
    array ordinal blue[4]
    array ordinal luma[16]
    ordinal btype = 4
}
class cxStill4x4Block{
    ordinal btype = 5
}
class cxMotion4x4Block{
    ordinal x
    ordinal y
    ordinal btype = 6
}
class image {
    integer width
    integer height
    integer widthInBlocks
    integer heightInBlocks
```

```
              -continued array pixel[width][height]
    4x4Block GetNext4x4Block(){see 1. below }
    4x4Block Get4x4Block( integer offsetX,
    integer offsetY){see 2. below }
    Set4x4Block( integer blockX, integer blockY,
    4x4Block){see 1. below }
}
```

1.We employ a trivial mechanism for accessing 5×5 blocks of image pixels on 4×4 boundaries in scan-line order so that each block accessed in sequence contains 9 previously accessed (or black) pixels from the column to the left and the row above.

2.For the purposes of motion block compression, we employ a mechanism for accessing 5×5 blocks of image pixels on arbitrary boundaries in arbitrary order from a previously compressed frame. The two function paramaters are x,y signed distances from the current block. This is a less trivial operation especially on odd borders, as the green values are stored at full resolution and the chromas are stored at half resolution. Our solution is to access the green values at fall resolution and the chroma values at half resolution, leaving off the remainder in the odd-border cases, and recombine the green values with their new chromas.

Process control:

For the purposes of description we employ several terms for organizing the execution of processes conditionally or in a particular order:

for {every x} {do something to x} while {a condition exists} {do something} if {a condition exists}{do something} else {do something else}

The mechanisms described above will create a valuable shorthand for concretely describing our algorithm.

TrueMotion II Description

The following is a further description of the TM2 algorithm:

Source Material

Various methods for representing color images exist and virtually all are compressable using TM2. For the purposes of this description we will assume the source material (source) is a sequence of images stored as sequences of 24 Bit color pixels, 8 bits for each color component, red green and blue (rgb). The color information can be 'interlaced' (rgb rgb rgb rgb etc.) or planar (rrrrrrrr . . . gggggggg . . . bbbbbbbb . . . ). Typically, the pixels in a source image are stored in order starting at the upper right and end at the lower left, scanned horizontally like the letters and words in this text. We will call this method of organization Scan-Line order. Each 8-bit value in the sequence represents the intensity of one of the color components at a single point in the source image.

Compressed Output

The result of using the TM2 Compression algorithm to compress the source material is a sequence of 'compressed' images, each consisting of a sequence of binary digits (bits). The data in a single compressed frame is comprised of as many as 7 sequences of tokens called streams, one stream for each of the 7 different types of token: HiResLuma deltas, LoResLuma deltas, HiResChroma deltas, LoResChroma deltas, Update color differences, Motion coordinates and BlockType tokens. Each stream is preceeded by a value representing length-in-tokens and may also be preceeded by additional data. The tokens are represented as variable-bit-length binary numbers.

Compressing an entire sequence of images:

Data-rate control is automatic. The user of the algorithm must enter a desired data-rate for the entire sequence of images. As images are sequentially compressed, the algorithm accumulates the average data-rate for each frame. Using this number, the data rate for the most recently compressed frame, a predicted data-rate based on pre-compression or average acceleration and the user-selected data-rate, the algorithm adjusts the values of the threshold for each blockType to allow blocktypes with lower data-rate's to be used.

Compressing a single frame:

Color Space reduction filter:

Once a source image is read into memory the differences between red-green and blue-green (red/blue differences) for every 2×2 block of pixels are averaged and clipped to recombine without outranging with the green component of each of the 4 pixels in the 2×2 block. The result is an image whose red, green and blue values change at every pixel (like the original) but whose red/blue differences are the same for all 2×2 pixel regions along even boundaries. We will refer to these red/blue differences as Chroma Vectors. (refer to FIG 1)

Image Padding

Above the uppermost and to the left of the leftmost lines of the source image's pixels, additional lines of permanently black pixels are added to allow lines of pixels above and to the left of the original image to have known values when accessing the leftmost and topmost lines of 5×5 blocks. In addition to this padding, rows and columns of coherent color may be added to the right and bottom of the original source image to allow the compression algorithm to access pixels on 4×4 boundaries.

The Compression Algorithm:

An image is loaded into memory. If previous images in the sequence have been compressed, the previously compressed image exists in memory in its decompressed state.

The image's 4×4 blocks are traversed in scan-line order and the following logic is applied to each in sequence:

```
blockType cx4x4Block::Compress( 4x4Block blk,image lastFrame,
                     integer bx, integer by,
                     ThreshTable dThr,
                  TokenBus dtb,
                     integer keyframe)
{
    4x4Block lastBlk;
    4x4Block highBlk;
    blk.CopyInto( &highBlk);
    cxHiResBlock hiRes( &highBlk, dtb);
    if( !keyframe){
        lastFrame.ReadBlockFromMap( bx, by, &lastBlk);
        if( dThr.Threshold( STILL)){
            cxStillBlock stl( blk,&highBlk, &lastBlk,
                dThr.Threshold( STILL));
            if( stl.isValid) { stl.write( dtb);
                return STILL;}
        }if( dThr.Threshold( MOTION)){
            duk_MotionBlock mot( blk,&highBlk,
                    lastFrame, bx, by, dtb,
                    dThr.Threshold( MOTION));
            if( mot.isValid) {mot.write( dtb);
                return MOTION;}
        }
```

```
        -continued

}
if( dThr.Threshold( NUL_RES)){
        cxNulResBlock nulRes( blk,&highBlk,
            dThr.Threshold( NUL_RES));
        if( nulRes.isValid) { nulRes.write( dtb);
        return NUL_RES;}
} if( dThr.Threshold( LO_RES)){
        cxLowResBlock loRes( blk,&highBlk, dtb,
            dThr.Threshold( LO_RES));
        if( loRes.isValid) { loRes.write( dtb);
        return LO_RES;}
}
if( !keyframe){
        if( dThr.Threshold( UPDATE)){
            cxUpdateBlock update( blk,&highBlk, &lastBlk, dtb,
                dThr.Threshold( UPDATE));
            if( update.isValid) { update.write( dtb);
            return UPDATE;}
        }
}
if( dThr.Threshold( MED_RES)){
        cxMedResBlock medRes( blk,&highBlk, dtb,
            dThr.Threshold( MED_RES));
        if( medRes.isValid) { medRes.write( dtb);
        return MED_RES;}
}
highBlk.CopyInto( blk);
hiRes.write( dtb); return HI_RES
}
```

The Four Intraframe Blocktypes:

High-Res-Block Compression

To compress a 4×4 block of pixels at Hi-Res we require two tables of deltas, Hi-res Chroma and Hi-res Luma—each a list containing a range of positive and negative integers which ususally remain constant for an entire image. We also require the 9 decompressed pixel values above and to the left of the 16 pixels we are compressing. Consequently, as described above, a 5×5 block of pixels is required to compress a 4×4 block of pixels.

Figure 2:
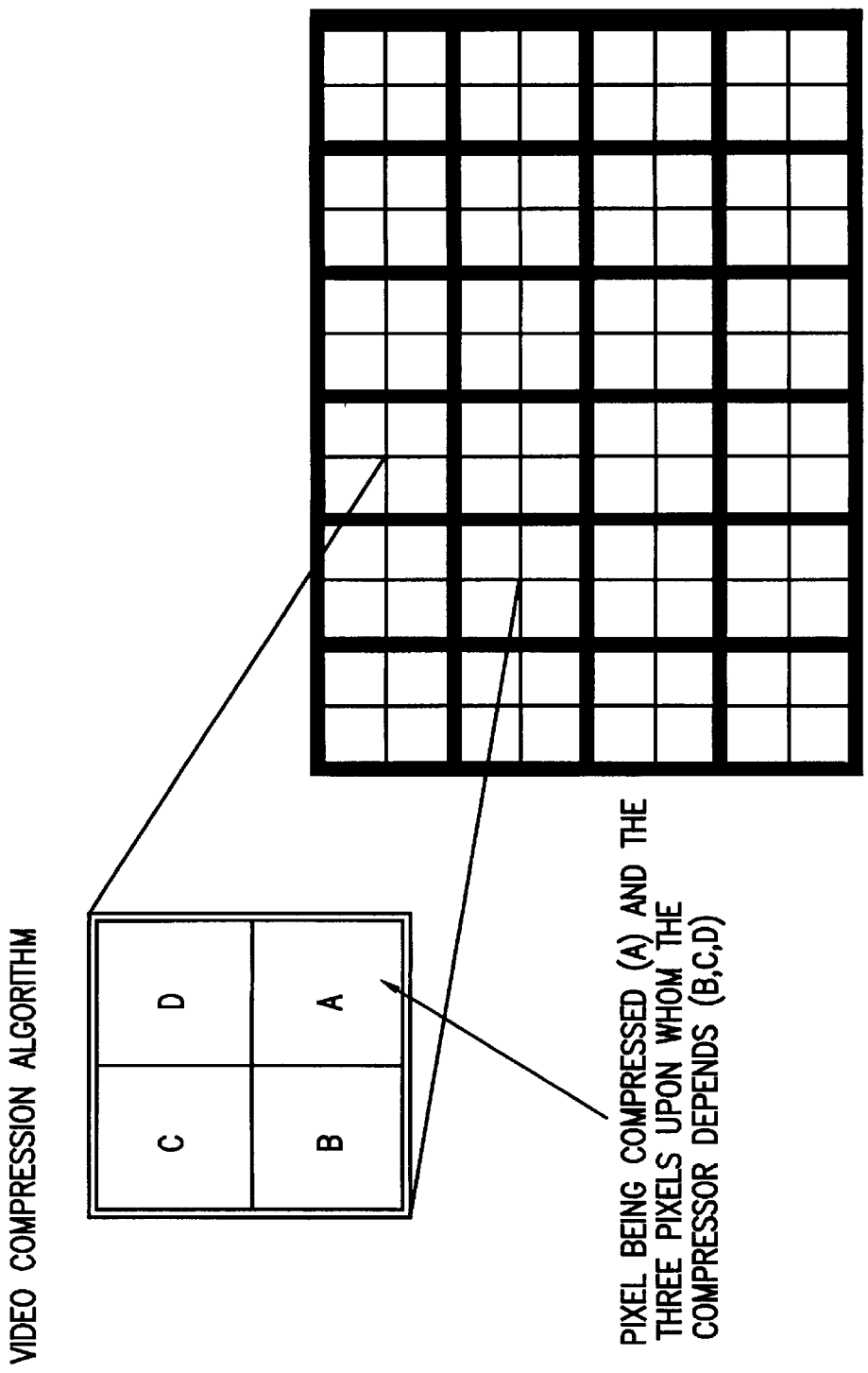

Compressing a 4×4 block as Hi-Res results in eight values (4 red and 4 blue Delta ordinals) being entered in a Hi-Res Chroma array, 16 values (luma delta ordinals) being entered in a Hi-Res luma array and one blocktype ordinal. (see FIG. 2)

1. The original (colorspace reduced) pixel values in the 5×5 block are stored in a temporary location.

2. margin, A value representing the amount which the lower-right 16 pixel values must be clipped (each color component added to or subtracted from to prevent outranging) is set to 1.

```
3. For every pixel ( accessed in scan-line order){
    we will say the pixel in question = A
    the pixel to the left = B
    the pixel to the left and above = C
    the pixel above = D
    If the pixel lies on an even boundary{
        CVP = chroma( B) - chroma( C)
        CDelta = chroma( A) - chroma( D) - CVP
        Search Hi-ResChroma DeltaTable for two values
        representing the
            nearest match with CDelta's redDiff and
            blueDiff components
        set CDelta to these values
        store indeces to both chosen table entries in red[nextposition]
        and blue[nextPosition]
```

```
        CA = CVP + chroma( D) + CDelta
        }
        LVP = luma( b) - luma( c)
        If the pixel lies on an even boundary{
            add to LVP redDiff( CDelta) * 7 +blueDiff( CDelta) * 5
        }
        GVP = green( B) - green( C) + green( D)
        LDelta = luma( A) - luma( D) - LVP
        GDelta = LDelta /24;
        Search Hi-Res Luma DeltaTable for a value representing the
    nearest match with GDelta
        set GDelta to this value
        maybeG = GVP + GDelta
        if { (pixelA.combine( maybeG, CA ( or chroma( D) if row
            is odd))) == SUCCEEDED}{
            store index to chosen table entry in luma[nextPosition]
            }
            if any component of the resulting pixel is greater than 8
            bits or less than 0{
                for every entry in the Hi-res luma delta Table {
                    LDelta = thisTableEntry * 24;
                    LA = LVP + LDelta + luma( D)
                    maybeG = GVP + thisTableEntry
                    if ( pixelA.combine( maybeG, CA ( or chroma( D)
                    if row is odd))==SUCCEEDED) {
                        if the absolute value of
                        luma( A) - LA is less
                        than the value computed for the previous
                    delta ( or less than 64000 if this is the
                                first entry) {
                                store index to chosen table entry in
                                luma[currentPosition]
                                store index to chosen table entry in
                            current position in Compressed-Luma
                        Array
                            }
                        }
                    }
                }
        If an index has not yet been stored for this
            pixel's luma value{
            reset the 4x4 blocks pixel values to the saved original
            values set margin equal to double it's value
            clip all 16 pixel values by margin
            do over from step 3 with newly clipped pixel values.
        }
        set GDelta to the chosen entry in Hi-Res_luma
        delta table for this pixel
        maybeG = GVP + GDelta
        set A = combine( maybeG, CA (or chroma( D)
        if row is odd))
        if ( any component of the resulting pixel is
        greater than 8 bits or less than 0) and
(margin < 128 or ( ½ bit depth
if not 8 bits)){
        set margin equal to double it's value
        clip all 16 pixel values by margin
        do over from step 3 with newly clipped pixel values.
        }
        pixel A now contains an approximation of the pixel at the
    same location in the original image. its values are equal to
    the pixel values in the decompressed image.
    }
```

Medium-Res-Block Compression

To compress a 4×4 block of pixels at Medium-Res we require two tables of deltas, Lo-res Chroma and Hi-res Luma, the 16 pixels we are compressing, the 9 decompressed pixel values above and to the left of the 16 pixels we are compressing, a 4×4 block of pixels whose values represent the decompressed Hi-Res version of the 4×4 block and a threshold representing the maximum allowable 'distance' between the Medium-Res decompressed 4×4 block and the High-Res decompressed 4×4 block.

Compressing a 4×4 block as Medium-Res results in two values (red and blue Delta ordinals) being entered in a Lo-Res Chroma array, 16 values (luma delta ordinals) being entered in a Hi-Res luma array and one blocktype ordinal.

1.The original (colorspace reduced) pixel values in the 5×5 block are stored in a temporary location.

The chromas for pixel (1,0), (2,0),(0,1) and (0,2) are discarded and new chromas for these pixels are calculated by interpolating between pixels (0,0) and (0,3) and also between pixels (0,0) and (3,0) if after combining any of the green values from the changed pixels with their respective new chroma vectors causes an outrange (ie any component value exceeds 8 bits or is less than 0), no Medium-Res compression occurs and a failure is reported.

```
2.For every pixel ( accessed in scan-line order){
    we will say the pixel in question = A
    the pixel to the left = B
    the pixel to the left and above = C
    the pixel above = D
    the pixel to the left and below = E
    the pixel to the right and above = F
    If the this is the upper-leftmost pixel{
        CVP = chroma( E) - chroma( C)
        CDelta = chroma( A) - chroma( F) - CVP
        Search Lo-ResChroma DeltaTable for two values
representing the nearest match with CDelta's
redDiff and blueDiff components
        set CDelta to these values
        store indeces to both chosen table entries in next 2
        positions in Compressed-Chroma Array
        set CVP = chroma( B) - chroma( C)
        CA = CVP + chroma( D) + CDelta
    }
    if this pixel lies in the upper-left corner
    of a chroma quadrant{
        CVP = chroma( B) - chroma( C)
        CA = CVP + chroma( D)
    }
    if this pixel doesn't lie in the upper-left
    corner of a chroma quadrant{
        CA = chroma( d)
    }
    LVP = luma( b) - luma( c)
    If the this is the upper-leftmost pixel{
        add to LVP redDiff( CDelta) * 7 +
        blueDiff( CDelta) * 5
    }
    GVP = green( B) - green( C) + green( D)
    LDelta = Luma( A) - luma( D) - LVP
    GDelta = LDelta /24;
    Search Hi-Res Luma DeltaTable for a value representing the
nearest match with GDelta
        set GDelta to this value
        maybeG = GVP + GDelta
        pixelA = combine( maybeG, CA)
        if no component of the resulting pixel is greater than 8
            bits or less than 0{
            store index to chosen table entry in next
            position in Compressed-
Luma Array.
        }
        if any component of the resulting pixel is greater than 8
            bits or less than 0{
            for every entry in the Hi-res luma delta Table{
                LDelta = thisTableEntry * 24;
                LA = LVP + LDelta + luma( D)
                maybeG = GVP + thisTableEntry
                pixelA = combine( maybeG, CA)
                if no component of the resulting pixel is
greater than 8 bits or less than 0{
                    if the absolute value of luma( A) - LA is less
                    than the value computed for the previous
delta ( or less than 64000 if this is the
                        first entry){
                        store index to chosen table entry in
                        current position in Compressed-Luma
Array
```

-continued

```
                }
            }
        }
    }
    set GDelta to the chosen entry in Hi-Res_luma
        delta table for this pixel
        maybeG = GVP + GDelta
        set A = combine( maybeG, CA)
        pixel A now contains an approximation of the pixel at the
            same location in the original image. its values are equal
to the pixel values in the decompressed image.
}
```

3.if the sum of the results of comparing (function compare ()) the 16 decompressed Hi-Res pixels with the 16 decompressed Medium-Res pixels is greater than the Medium-Res threshold, copy the saved original pixel values into the 5×5 pixel block and report failure.

Low-Res-Block Compression

To compress a 4×4 block of pixels at Low-Res we require two tables of deltas, Lo-res Chroma and Lo-res Luma, the 16 pixels we are compressing, the 9 decompressed pixel values above and to the left of the 16 pixels we are compressing, a 4×4 block of pixels whose values represent the decompressed Hi-Res version of the 4×4 block and a threshold representing the maximum allowable 'distance' between the Lo-Res decompressed 4×4 block and the High-Res decompressed 4×4 block.

Compressing a 4×4 block as Low-Res results in two values (red and blue Delta ordinals) being entered in a Lo-Res Chroma array and 4 values (luma delta ordinals) being entered in a Lo-Res luma array and a blocktype ordinal.

1.The original (colorspace reduced) pixel values in the 5×5 block are stored in a temporary location.

The chromas for pixel (1,0), (2,0), (0,1) and (0,2) are discarded and new chromas for these pixels are calculated by interpolating between pixels (0,0) and (0,3) and also between pixels (0,0) and (3,0). This process is described in detail in section 'Edge Interpolation' below.

Green (1,0), (3,0), (0,1) and (0,3) are discarded and new green values for these pixels as follows:

pixel(0,1): interpolating between pixels (0,0) and (0,2)
    pixel(0,3): interpolating between pixels (0,2) and (0,4)
    pixel(1,0): interpolating between pixels (0,0) and (2,0)
    pixel(3,0): interpolating between pixels (2,0) and (4,0)

if after combining any of the green values from the changed pixels with their respective new chroma vectors causes an outrange (ie any component value exceeds 8 bits or is less than 0), no Lo-Res compression occurs and a failure is reported.

```
2.For every pixel in the 4x4 block( accessed in scan-line order){
    we will say the pixel in question = A
    the pixel to the left = B
    the pixel to the left and above = C
    the pixel above = D
    the pixel to the left and below = E
    the pixel to the right and above = F
    If the this is the upper-leftmost pixel{
        CVP = chroma( E) - chroma( C)
```

-continued

```
        CDelta = chroma( A) – chroma( F) – CVP
        Search Lo-ResChroma DeltaTable for two values
representing the nearest match with CDelta's
redDiff and blueDiff components
        set CDelta to these values
        store indeces to both chosen table entries in next 2
        positions in Compressed-Chroma Array
        set CVP = chroma( B) – chroma( C)
        CA = CVP + chroma( D) + CDelta
    }
    if this pixel lies in the upper-left corner of a chroma quadrant{
        CVP = chroma( B) – chroma( C)
        CA = CVP + chroma( D)
    }
    if this pixel doesn't lie in the upper-left corner of a chroma
quadrant{
        CA = chroma( d)
    }
    LVP = luma( b) – luma( c)
    If the this is the upper-leftmost pixel {
        add to LVP redDiff( CDelta) * 7 + blueDiff( CDelta) * 5
    }
    set GDelta 0
    if this pixel lies in the upper-left corner of a chroma quadrant{
        save the original values in the 2x2 quadrant in a temporary
        location for every delta in the lo-res luma delta table{
            For every pixel in the 2x2 quadrant( accessed
        in scan-line order){
                we will say the pixel in question = A
                the pixel to the left = B
                the pixel to the left and above = C
                the pixel above = D
                if this is the upper left pixel {
                    GD = thisTableEntry
                }
                if this is not the upper left pixel {
                    GD = 0
                }
                GVP = Green( B) – Green( C)
                maybeG = GVP + green( D) + GD
                set A = combine( maybeG, CA)
                if any component of the resulting pixel is
            greater than 8 bits or less than 0{
                    reset 2x2 quadrant to original pixel values
                    try the next delta table entry
                }
            }
            compare each of the four new pixels in the 2x2
            quadrant with the corresponding Hi-Res compressed pixels,
            sum the results and save this total if
            lower than the previously saved one ( or infinity
            if this is the first table entry)
        }
    }
    set GDelta to the table entry with the
    lowest comparison results store index to chosen
    table entry in next position in LoRes-Luma
Array
    }
    GVP = green( B) – green( C)
    maybeG = GVP + GDelta
    set A = combine( maybeG, CA)
    pixel A now contains an approximation of the
pixel at the same location in the original image.
its values are equal to the pixel values in the decompressed image.
}
```

3. if the sum of the results of comparing (function compare ()) the 16 decompressed Hi-Res pixels with the 16 decompressed Lo-Res pixels is greater than the Lo-Res threshold, copy the saved original pixel values into the 5x5 pixel block and report failure.

Null-Res Block Compression

1. The original (colorspace reduced) pixel values in the 5x5 block are stored in a temporary location.

2. Null Res blocks require only 3 pixels from the original 5x5 block for compression, pixels (0,0), (0,4) and (4,0 ). Null—retains no ordinals other than the block-type ordinal.

Divisions by 4 or 2 in the following calculaions are expressed as x/4 or x/2 for simplicity, however, this should be read 'arithmetic shift x right by 2' r arithmetic shift x right by 1 respectively.

```
3. Green values for the 16 null-res block pixels
are calculated as follows:
    green (1,1) = green( 0,0) + ((green( 0,4) – green( 0,0)) / 4) +
            ((green( 4,0) – green( 0,0)) / 4)
    green (2,1) = green( 0,0) + ((green( 0,4) – green( 0,0)) / 4) +
            ((green( 4,0) – green( 0,0)) / 2)
    green (3,1) = green( 4,0) + ((green( 0,4) – green( 0,0)) / 4) –
            ((green( 4,0) – green( 0,0)) / 4)
    green (4,1) = green( 4,0) + ((green( 0,4) – green( 0,0)) / 4)
    green (1,2) = green( 0,0) + ((green( 0,4) – green( 0,0)) / 2) +
            ((green( 4,0) – green( 0,0)) / 4)
    green (2,2) = green( 0,0) + ((green( 0,4) – green( 0,0)) / 2) +
            ((green( 4,0) – green( 0,0)) / 2)
    green (3,2) = green( 4,0) + ((green( 0,4) – green( 0,0)) / 2) –
            ((green( 4,0) – green( 0,0)) / 4)
    green (4,2) = green( 4,0) + ((green( 0,4) – green( 0,0)) / 2)
    green (1,3) = green( 0,4) – ((green( 0,4) – green( 0,0)) / 4) +
            ((green( 4,0) – green( 0,0)) / 4)
    green (2,3) = green( 0,4) – ((green( 0,4) – green( 0,0)) / 4) +
            ((green( 4,0) – green( 0,0) / 2 )
    green (3,3) = green( 0,4) – ((green( 0,4) – green( 0,0)) / 4) +
            (green( 4,0) – green( 0,0)) –
            ((green( 4,0) – green( 0,0))/4)
    green (4,3) = green( 4,0) + (green( 0,4) – green( 0,0)) –
            ((green( 0,4) – green( 0,0)) / 4)
    green (1,4) = green( 0,4) + ((green( 4,0) – green( 0,0) / 4)
    green (2,4) = green( 0,4) + ((green( 4,0) – green( 0,0)) / 2)
    green (3,4) = green( 0,4) + (green( 4,0) – green( 0,0)) –
            ((green( 4,0) – green( 0,0) / 4)
    (green (4,4) = green( 0,4) + (green( 4,0) – green( 0,0))
4. Chroma vectors for the 4 null-res block chroma
quadrants are computed as follows:
    chromaQuad( 1,1) = chroma( 0,0) + ((chroma( 2, 0) –
            chroma( 0,0))/ 2) + ((chroma( 0, 2) –
            chroma( 0,0))/ 2)
    chromaQuad( 2,1) = chroma( 2,0) + (( chroma( 0, 2) –
            chroma( 0,0))/ 2)
    chromaQuad( 1 ,2) = chroma( 0, 2) + (( chroma( 2, 0) –
            chroma( 0,0))/ 2)
    chromaQuad( 2,2) = chroma( 2,0) + ( chroma( 0,2) –
            chroma(0,0))
```

5. if the sum of the results of comparing (function compare ()) the 16 decompressed Hi-Res pixels with the 16 decompressed Nul-Res pixels is greater than the Nul-Res threshold, copy the saved original pixel values into the 5x5 pixel block and report failure.

The Three Interframe Blocktypes:

The following 3 Blocktypes are called interframe because they depend not only on the raw data in the current image but also on data (pixels) from a previously compressed image.
Update block compression:

1. Compressing a 4x4 pixel block as an 'Update' block reqires a single deltaTable, the decompressed pixel values from the block with the same coordinates in a previously compressed image, a Hi-res compressed version of the current block and the current uncompressed 4x4 block.

2. Compressing a 4x4 block as Update results in eight ordinals (4 red and 4 blue difference s), 16 ordinals (green difference ordinals) being entered in an update array and one blocktype ordinal.

3. The original (colorspace reduced) pixel values in the 5x5 block are stored in a temporary location.

```
4. for { all 16 pixels }{
    greenOrdinal[currentpixelIndex] =
    updateDeltaTable.nearest
    ( currentBlock.( ( green[currentPixelIndex] −
        previousBlock.green[currentPixelIndex]))
    green[currentPixelIndex] =
        previousBlock.green[currentPixelIndex] +
        currentBlock.( ( green[currentPixelIndex]
    }
    {
        a similar operation is used on chroma ordinals
    }
```

Still Block Compression:

A compressed Still block retains only one ordinal (blocktype).

1. Compressing a 4×4 pixel block as a 'Still' block is simply using the decompressed pixel values from the block with the same coordinates in a previously compressed image.

2. The original (colorspace reduced) pixel values in the 5×5 block are stored in a temporary location.

3. if the sum of the results of comparing (function compare()) the 16 decompressed Hi-Res pixels with the 16 previously compressed pixels is greater than the 'Still' threshold, copy the saved original pixel values into the 5×5 pixel block and report failure.

Motion Block Compression

Compressing a 4×4 pixel block as a 'Motion' block reqires a single deltaTable, the decompressed pixel values from the entire previously compressed image, a Hi-res compressed version of the current block and the current uncompressed 4×4 block.

Figure 3:
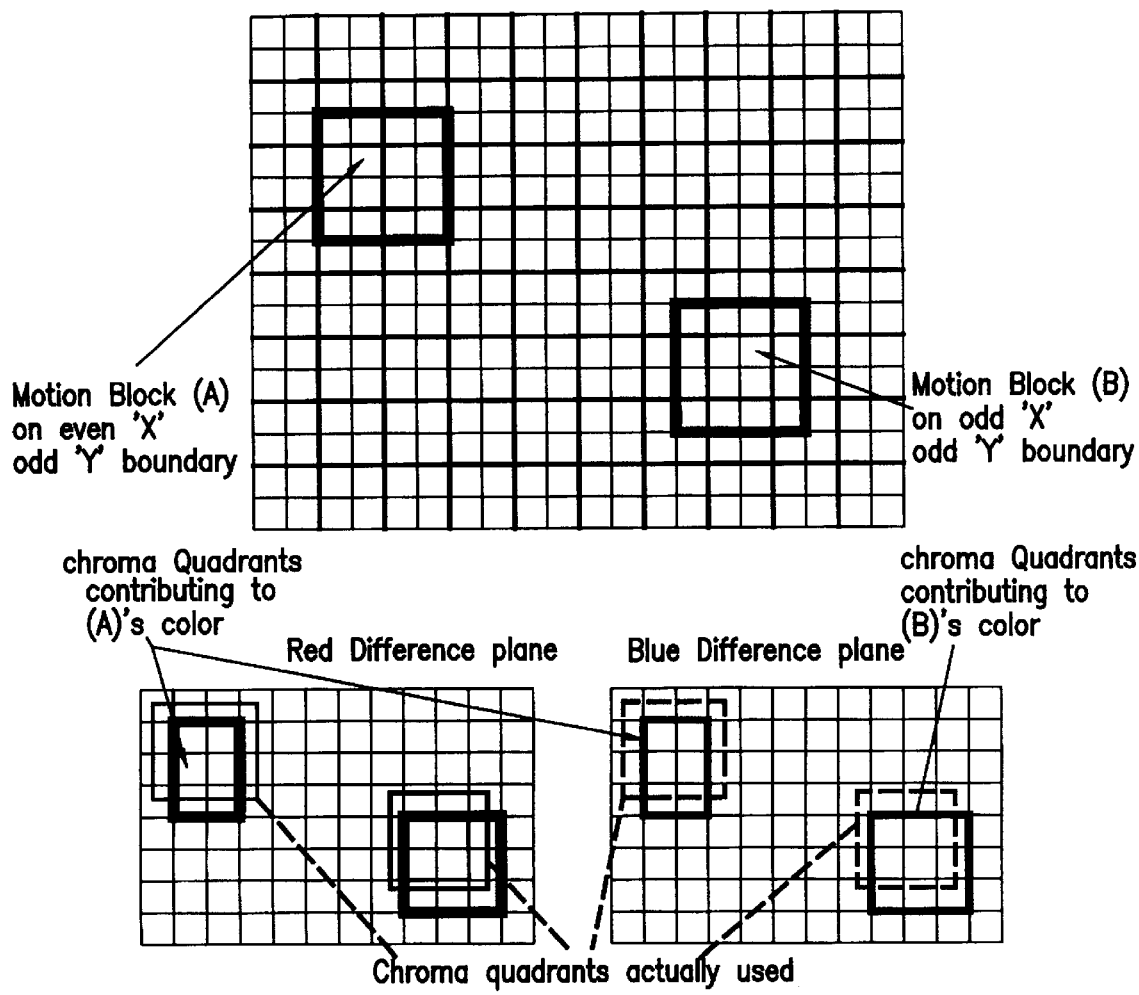

A compressed Motion block retains two ordinals representing the signed x and y distances to the upper left corner of a 4×4 region in the previous frame to the upper-left corner of the current block (blocktype) (see FIG. 3).

1. Compressing a 4×4 pixel block as a 'Motion' block is requires copying the decompressed green and chroma values from the pixels in a 4×4 region with different, possibly non-aligned coordinates in a previously compressed image.

2. The original (colorspace reduced) pixel values in the 5×5 block are stored in a temporary location.

3. every 4×4 pixel region in the previous frame that lies within a pre-set distance from the block being compressed is compared with the block being compressed and, provided the lowest return value is lower than the motion-block threshold, the pixels of 4×4 region which compares most favorably (the one with the lowest compare() return value) are copied into the current 4×4Block. The ordinals of the x,y distances of the chosen region are retained.

The lossless Compression Algorithm

When the above logic loop it complete a single video image, seven buffers of fixed bit-length ordinals contain the information required to approximately reconstruct the image. They are the High-res Chroma buffer, the Low-res Chroma buffer, the High-res Luma buffer, the Low-res Luma buffer, the Update buffer, the Motion buffer and the blocktype buffer. This information will remain in this order as the file is further compressed, the constituent fixed bit-length ordinals will be replaced by variable bit length tokens by a known process called Huffman encoding. A brief description of our application of this technique follows:

For each buffer, a histogram is constructed denoting each represented value's population in the buffer. Then a special table of binary numbers is constructed, each unique entry in the table representing an ordinal value. Using a known technique, binary numbers of minimum possible bit-length are chosen to represent ordinal values with the highest populations.

Each buffer is prepended with a length in tokens and an encapsulated version of this table for decoding the buffer's contents. Then each ordinal is converted to its corresponding binary 'token' in the table and re-packed into the buffer.

When this process is complete, the seven buffers are archived as a single image in the compressed video sequence.

We claim:

1. A method for compressing data comprising:

providing an image, said image comprising blocks of pixels;

providing a selection of blocktypes, each of said blocktypes comprising a distinctive type of compression for compressing said blocks of pixels;

selecting a first block of pixels in said image;

selecting a first blocktype of said blocktypes for optimum compression of said first block of pixels, said first blocktype being selected from a group consisting of high resolution blocktype, medium resolution blocktype, low resolution blocktype, null resolution blocktype, still blocktype, motion blocktype and update blocktype;

using said first blocktype to compress said first block of pixels.

2. A method as claimed in claim 1, comprising the steps of selecting a second block of pixels in said image and selecting a blocktype from said group of blocktypes for compression of said second block of pixels.

3. A method as claimed in claim 1, wherein said blocktype selected for compression of said second block of pixels is a different blocktype from said first blocktype.

4. A method as claimed in claim 1, wherein said step of selecting a blocktype comprises the steps of:

compressing said first block using an initial blocktype from said group of blocktypes to obtain a first compressed variation of said first block;

compressing said first block using a second blocktype from said group of blocktypes to achieve a second compressed variation of said first block;

comparing said first compressed variation of said compressed block to said second compressed variation of said compressed block; and, selecting said first blocktype for compression of said first block based on the results of said comparison of said first compressed variation of said first block to said second compressed variation of said first block.

5. A method as claimed in claim 1, wherein said blocktypes comprise intraframe types of compression and interframe types of compression.

6. A method as claimed in claim 1, wherein said first blocktype is selected to be an intraframe blocktype.

7. A method as claimed in claim 1, wherein said first blocktype is selected to be an interframe blocktype.

8. A method as claimed in claim 1, wherein said first blocktype is selected to optimize the quality of compression and decompression of said pixel.

9. A method as claimed in claim 1, wherein said first blocktype is selected to optimize the speed of compression of said pixel.

10. A method as claimed in claim 1, wherein said step of using said first blocktype, selected from said group of blocktypes, to compress said first block of pixels further comprises the step of selecting deltas for delta encoding of said block of pixel, said deltas being selected from at least one table corresponding to said first selected blocktype.

11. A method as claimed in claim 10, wherein said deltas are selected from a high resolution chroma table and a high resolution luma table when said first selected blocktype is a high resolution blocktype.

12. A method as claimed in claim 10, wherein said deltas are selected from a low resolution chroma table and a high resolution luma table when said first selected blocktype is a medium resolution blocktype.

13. A method as claimed in claim 10, wherein said deltas are selected from a low resolution chroma table and a low resolution luma table when said first selected blocktype is a low resolution blocktype.

* * * * *